(12) United States Patent
Nishio et al.

(10) Patent No.: US 7,877,513 B2
(45) Date of Patent: Jan. 25, 2011

(54) INTELLIGENT INFORMATION RETRIEVAL SYSTEM USING HIERARCHICALLY CLASSIFIED PREFERENCES

(75) Inventors: Fumihiko Nishio, Kanagawa (JP); Kimiyoshi Yoshida, Kanagawa (JP)

(73) Assignee: Sony Corporation, Tokyo (JP)

( * ) Notice: Subject to any disclaimer, the term of this patent is extended or adjusted under 35 U.S.C. 154(b) by 716 days.

(21) Appl. No.: 11/236,193

(22) Filed: Sep. 27, 2005

(65) Prior Publication Data

US 2006/0026266 A1    Feb. 2, 2006

Related U.S. Application Data

(63) Continuation of application No. 10/008,117, filed on Nov. 8, 2001, now abandoned, which is a continuation of application No. 08/990,703, filed on Dec. 15, 1997, now Pat. No. 6,381,651.

(51) Int. Cl.
*G06F 15/16* (2006.01)
(52) U.S. Cl. .................................. 709/245; 709/217
(58) Field of Classification Search ............ 709/225, 709/217; 706/934
See application file for complete search history.

(56) References Cited

U.S. PATENT DOCUMENTS

| | | | | |
|---|---|---|---|---|
| 5,063,523 A | * | 11/1991 | Vrenjak | 709/223 |
| 5,065,347 A | * | 11/1991 | Pajak et al. | 715/835 |
| 5,321,833 A | * | 6/1994 | Chang et al. | 707/5 |
| 5,377,354 A | * | 12/1994 | Scannell et al. | 718/103 |
| 5,619,648 A | * | 4/1997 | Canale et al. | 709/206 |
| 5,630,121 A | * | 5/1997 | Braden-Harder et al. | 707/999.102 |
| 5,724,567 A | * | 3/1998 | Rose et al. | 707/2 |
| 5,754,938 A | * | 5/1998 | Herz et al. | 725/116 |
| 5,790,785 A | * | 8/1998 | Klug et al. | 707/E17.119 |
| 5,832,212 A | * | 11/1998 | Cragun et al. | 707/E17.109 |
| 5,878,219 A | * | 3/1999 | Vance et al. | 709/217 |
| 5,933,827 A | * | 8/1999 | Cole et al. | 707/10 |
| 6,065,047 A | * | 5/2000 | Carpenter et al. | 709/218 |
| 6,208,989 B1 | * | 3/2001 | Dockter et al. | 707/5 |
| 6,901,392 B1 | * | 5/2005 | Kindo | 706/25 |
| 6,912,517 B2 | * | 6/2005 | Agnihotri et al. | 707/E17.109 |

OTHER PUBLICATIONS

Palme et al, Issues when desiging filter in messaging systems, Feb. 1996, Computer Communication, vol. 19, No. 2, pp. 95-101.*

(Continued)

*Primary Examiner*—Joseph E Avellino
*Assistant Examiner*—Jenee Williams
(74) *Attorney, Agent, or Firm*—SNR Denton US LLP

(57) ABSTRACT

A server computer stores user favorites information that relates to the favorites of a user. Whether digital information that has newly occurred on a network suits the favorites of the user is judged based on the user favorites information. If it is judged that there exists digital information that suits the favorites of the user, the server computer informs the user of the new establishment of the digital information that suits the favorites of the user by transmitting E-mail to the user. When a browsing request of the digital information is made by the user, the server computer delivers the digital information to the user and stores history information relating to a history of the digital information that has been delivered to the user. Thereafter, the server computer updates the user favorites information based on the history information.

6 Claims, 12 Drawing Sheets

OTHER PUBLICATIONS

Ficher et al, Information Access in Complex, Poorly Structured Information Spaces, in CHI'91 Proceedings, 1991, pp. 63-70.*

Asakura et al. "Internet information filter based on personal interests", NEC Technical Journal, Jul. 1996, vol. 49, No. 7, p. 17-23.*

* cited by examiner

FIG.3

| PERSON IDENTIFIER | PERSONAL FAVORITES INFORMATION | INFORMATION BROWSING HISTORY |
|---|---|---|

FIG.4

| INFORMATION IDENTIFIER | KEYWORD | FAVORITES INFORMATION | SUMMARY INFORMATION | INFORMATION BODY |
|---|---|---|---|---|

FIG.6

| | |
|---|---|
| NAME | [　　　　　] |
| E-MAIL ADDRESS | [XXX@YYYZZZ] |
| GENDER | ● MALE  ○ FEMALE |
| DATE OF BIRTH | [XXXX] YEAR [XX] MONTH [XX] DAY |
| HOBBIES | ☒ MUSIC |
| | ☐ ART |
| | ☐ SPORTS |
| | ☒ GAMES |
| | ⋮ |

REGISTRATION PICTURE

FIG.13

YOUR CURRENT FAVORITES STATUS IS AS FOLLOWS.

☒ MUSIC    ☐ CLASSIC
           ☒ ROCK
           ☐ POPS

☐ ART
☐ SPORTS
☒ GAMES
⋮

INTELLIGENT INFORMATION RETRIEVAL SYSTEM USING HIERARCHICALLY CLASSIFIED PREFERENCES

CROSS REFERENCE TO RELATED APPLICATIONS

The present application is a continuation of U.S. application Ser. No. 10/008,117, filed on Nov. 8, 2001 now abandoned, which claims priority to U.S. application Ser. No. 08/990,703 filed on Dec. 15, 1997, now U.S. Pat. No. 6,381,651, and to Japanese Application No. P08-338033 filed on Dec. 18, 1996, all of which are incorporated herein by reference to the extent permitted by law.

BACKGROUND OF THE INVENTION

The present invention relates to an information processing apparatus and an information processing method. In particular, the invention relates to an information processing apparatus and an information processing method which allow a user to easily acquire information that suits his favorites through the Internet, for instance.

In the Internet, for example, various kinds of information is provided to a user in various manners.

For example, if a user has himself registered in what is called a mailing list that is managed by an information provider who provides a certain kind of information, he can be provided with information from the information provider by electronic mail (E-mail).

Further, distributed electronic bulletin board systems called "net news" are constructed in the Internet, for example. A user can be provided with various articles by accessing what is called a net news server. In a net news system, when an article is written to a certain net news server, the article is delivered to other net news servers in a bucket-brigade-like manner. Therefore, information can be provided to many users efficiently.

Further, the WWW (world wide web) system that enables information delivery by use of a hyper text that is written in HTML (hyper text markup language) is constructed in the Internet, for instance. By utilizing the WWW system, a user can receive various information in the form of what is called home pages.

As described above, by utilizing the Internet, a user can be provided with information in various manners. However, since the amount of information is enormous, it is difficult for a user to easily acquire information that truly suits his favorites.

For example, in the case of the E-mail, since the same information is delivered to all users who are registered in a mailing list, it may include information that is needless to a certain user. Further, in the case of the E-mail, the cost of reception increases as the amount of information to be delivered increases.

In the net news system and the WWW system, a user needs to search for information that suits his favorites, which is cumbersome. Further, in the net news system and the WWW system, various information providers register new information, whereby new information occurs one after another on the Internet. A user needs to check, by accessing a net news server or a WWW server, whether new information that suits his favorites has occurred, which is also cumbersome.

SUMMARY OF THE INVENTION

The present invention has been made in view of the above circumstances, and an object of the invention is to allow a user to easily acquire information that suits his favorites.

The invention provides an information processing apparatus connected to a network, comprising favorites information storing means for storing user favorites information that relates to favorites of a user; judging means for judging, based on the user favorites information, whether information that has newly occurred on the network is suitable for the favorites of the user; informing means for informing the user of occurrence of the information that has been judged by the judging means to be suitable for the favorites of the user; and delivering means for delivering the information to the user when a browsing request of the information is made by the user.

Further, the invention provides an information processing method in an information processing apparatus which is connected to a network and stores user favorites information that relates to favorites of a user, comprising the steps of judging, based on the user favorites information, whether information that has newly occurred on the network is suitable for the favorites of the user; informing the user of occurrence of the information that has been judged by the judging step to be suitable for the favorites of the user; and delivering the information to the user when a browsing request of the information is made by the user.

BRIEF DESCRIPTION OF THE DRAWINGS

FIG. 3 shows a format of personal information;

FIG. 4 shows a format of delivery information;

FIG. 6 shows a registration picture;

FIG. 13 shows a picture for announcing personal favorites information that is updated by the personal favorites information update process.

DETAILED DESCRIPTION OF THE PREFERRED EMBODIMENT

Figure 1:
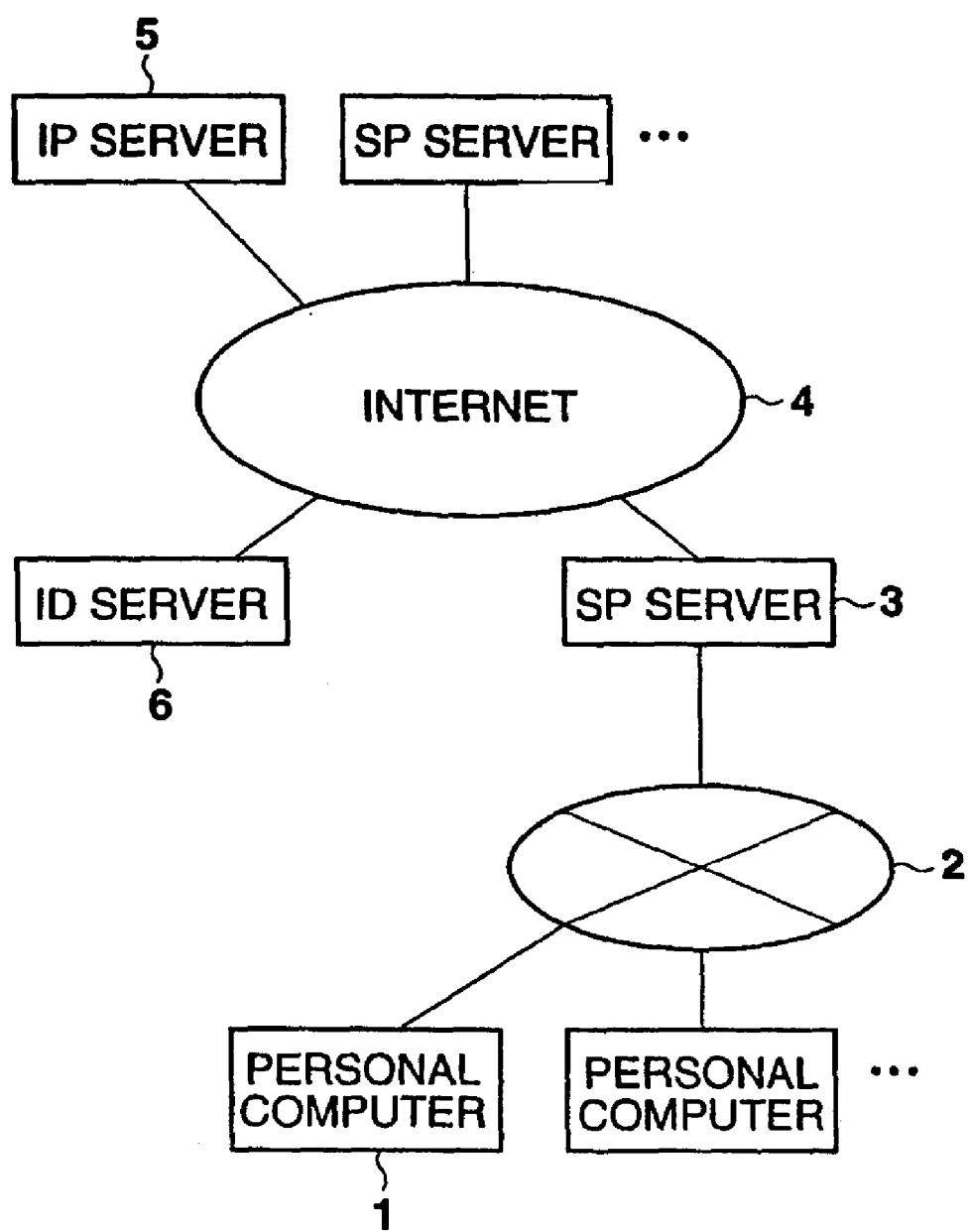
FIG. 1 shows the configuration of an embodiment of a network system to which the present invention is applied.

FIG. 1 shows the configuration of an embodiment of a network system to which the present invention is applied.

A user has a personal computer 1 (hereinafter referred to as "user terminal" where appropriate) which is connected to a SP (service provider) server 3 of a service provider (connecting company) via, for instance, a public network 2 such as a PSTN (public switched telephone network) or an ISDN (integrated service digital network) or a dedicated line (not shown). User terminals of other users are also connected to the SP server 3 in a similar manner. The SP server 3 is connected to the Internet 4. An IP (information provider) server 5 of an information provider and an ID (information deliverer) server 6 of an information deliverer are also connected to the Internet 4. The IP server 5 manages a database that stores various home pages (HPs) and is so configured as to provide the home pages in response to a request from a user by utilizing the WWW system. The ID server 6 is so configured as to deliver to a user information that suits his favorites (i.e., desired information).

In this embodiment, the ID server 6 also serves as an IP server.

In the Internet 4, communications are performed between computers according to a protocol called TCP/IP (transmission control protocol/Internet protocol). Further, the WWW system is constructed on the Internet 4. In the WWW system, data transfer is performed according to a protocol called HTTP (http; hyper text transfer protocol). By describing pictures in HTML (hyper text markup language), information retrieval and display can be performed easily in the form of home pages. For example, Netscape Navigator (trademark) of Netscape Communications Corporation and Mosaic (trademark) of NCSA are known as applications for the WWW system (WWW browsers) of the user terminal 1 on the user side and Netscape Commerce Server (trademark) is known as an application (WWW server) of the IP server 5 and the ID server on the information provider side. Each user can be provided with information or a service by accessing a Www server by using a WWW browser. Each information provider can provide information or a service to a WWW browser by using a WWW server.

Although a user can directly connect to the Internet 4, he usually contracts with a service provider and makes a connection to the Internet by accessing the SP server 3 via the public network 1 as shown in FIG. 1.

In the above-configured network system, when new information occurs on the Internet 4, that is, for instance when a new home page is registered in the IP server 5, the ID server 6 judges whether the new home page suits the favorites of the user of the user terminal 1. If it suits his favorites, a message to that effect is sent to him by E-mail, for instance. Looking at the E-mail, the user of the user terminal 1, if he wants to view the home page that is explained in the E-mail, makes a request for its viewing to the ID server 6 via the public network 2, the SP server 3, and the Internet 4 by manipulating the user terminal 1. Upon reception of the request for viewing of the home page (assumed to belong to the IP server 5) sent from the user terminal 1, the ID server 6 acquires the home page from the IP server 5 and transfers (delivers) it to the user terminal 1 via the Internet 4, the SP server 3, and the public network 2.

The user can thus easily acquire a home page that has newly occurred on the Internet 4 and suits his favorites.

The above-described service of informing a user of occurrence on the Internet 4 of a new home page that suits his favorites is called a new home page informing service.

By the way, to judge whether a new home page occurring on the Internet 4 suits the favorites of the user of the user terminal 1, the ID server 6 stores personal favorites information (user favorites information) relating to the favorites of the user. For example, the personal favorites information is input such that the user manipulates the user terminal 1, and transferred to the ID server 6 via the public network 2, the SP server 3, and the Internet 4 and stored therein.

The ID server 6 is so configured as to store history information that relates to a history of home pages that are requested by the user. Based on the history information, the ID server 6 updates the personal favorites information so that it reflects the fields (genres) of home pages requested by the user. In this manner, the ID server 6 can provide home pages that suit the favorites of the user.

Figure 2:
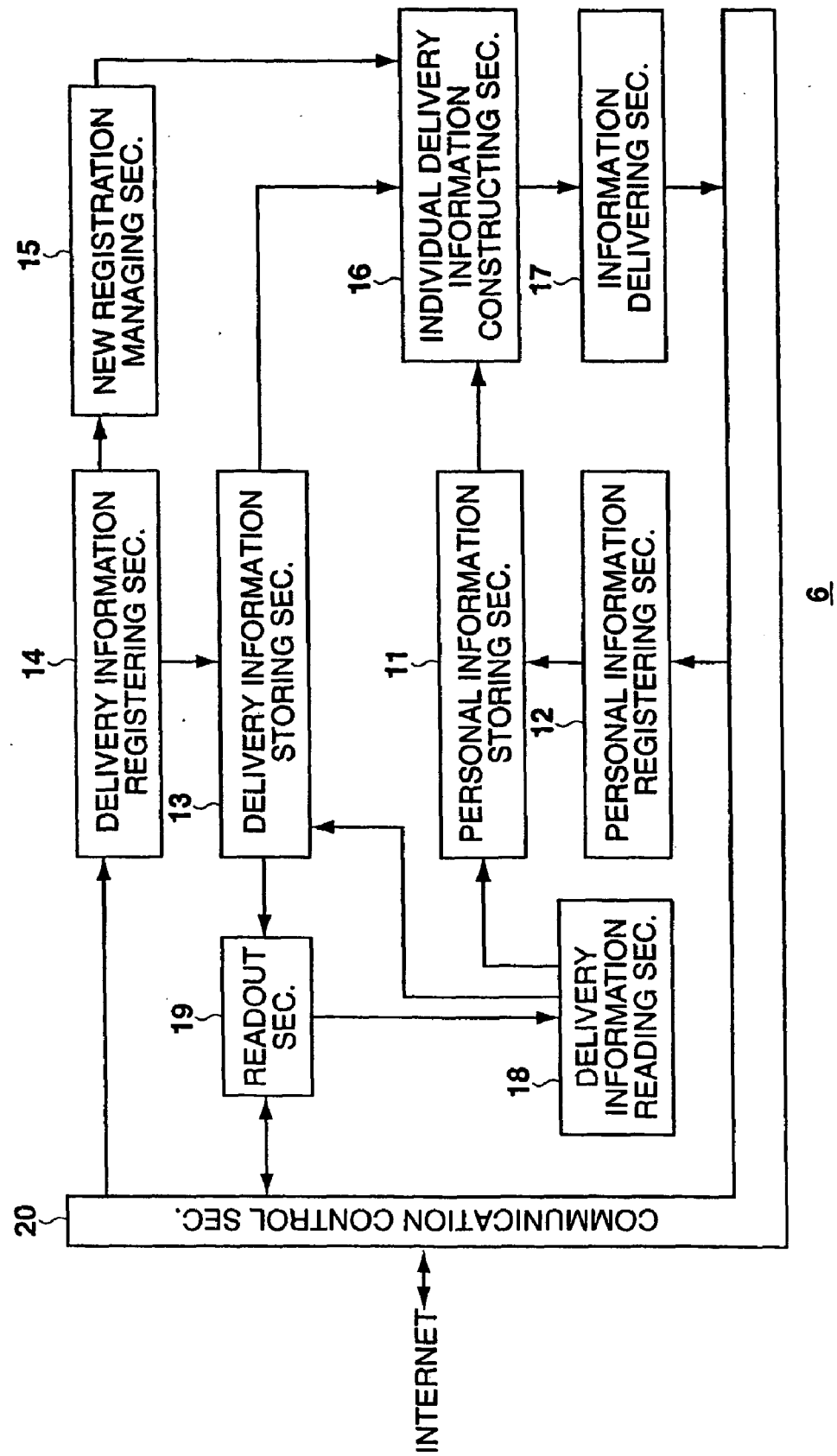
FIG. 2 shows an exemplary configuration of an ID server 6 shown in FIG. 1.

FIG. 2 shows an exemplary configuration of the ID server 6 shown in FIG. 1.

For example, a personal information storing section 11 is so configured as to store personal favorites information, history information, and other personal information relating to each user. A personal information registering section 12 is so configured as to register personal information that is received by a communication control section 20 in the personal information storing section 11. Having a manipulating section such as a keyboard (not shown), the personal information registering section 12 is so configured that personal information can also be registered in the personal information storing section 11 by manipulating the personal information registering section 12.

A delivery information storing section 13 stores delivery information including home pages (i.e., files written in HTML) as information to be delivered to users. The delivery information registering section 14 is so configured as to register delivery information in the delivery information storing section 13. Having a manipulating section such as a keyboard (not shown), the delivery information registering section 14 is so configured that delivery information can also be registered in the delivery information storing section 13 by manipulating the delivery information registering section 14.

A new registration managing section 15 is so configured as to store an information identifier for identifying delivery information that has been newly registered in the delivery information storing section 13. An individual delivery information constructing section 16 is so configured as to recognize delivery information that has been newly stored in the delivery information storing section 13 based on its information identifier stored in the new registration managing section 15, and to judge whether a home page stored in the delivery information suit the favorites of a user by referring to the personal information storing section 11. Further, the individual delivery information constructing section 16 is so configured as to read out, the home page included in the new delivery information suits the favorites of the user, summary information of the contents of the home page and other information from the delivery information storing section 13, construct individual delivery information, and supply it to an information delivering section 17. The information delivering section 17 is so configured as to output, to the communication control section 20 in the form of E-mail, the individual delivery information sent from the individual delivery information constructing section 16.

A delivery information reading section 18 is configured as to monitor a readout section 19 and to register, in the personal information storing section 11, history information relating to a history of home pages that have been provided to a user. The readout section 19 is so configured as to read out a home page that is requested by a user from the delivery information storing section 13 or acquire it from the IP server 5 or the like via the communication control section 20 and the Internet 4, and transfer it to the communication control section 20. The communication control section 20 is so configured as to perform a communication control with the Internet 4.

FIG. 3 shows a format of the personal information to be stored in the personal information storing section 11 shown in FIG. 2.

As shown in FIG. 3, the personal information is constructed such that a person identifier, personal favorites information (user favorites information), and an information browsing history are arranged sequentially.

Personal information of a user who is to be given the new home page informing service is registered in the personal information storing section 11. Since personal information is thus necessary for each user, person identifiers are used to discriminate among pieces of personal information of respective users. In this embodiment, an E-mail address, for instance, is used as the person identifier.

Information that is useful for recognition of the favorites of a user, such as an age, a gender, hobbies, and fields (genres) of interest of the user, is located at the position of the personal favorites information. The history information is located at the position of the information browsing history.

The person identifier is registered in the personal information storing section 11 when a personal information registration process is executed in the ID server 6 for instance. The personal information registration process is executed when the user accesses the ID server 6 and performs a proper manipulation on the user terminal 1. Details of the personal information registration process will be described later.

FIG. 4 shows a format of the delivery information to be stored in the delivery information storing section 13 shown in FIG. 2.

As shown in FIG. 4, the delivery information is constructed such that an information identifier, a keyword, favorites information, summary information, and an information body are arranged sequentially.

The information identifier is for identification of each delivery information. In this embodiment, it is, for instance, a URL (uniform resource locator) of a home page that is located at the position of the information body of the delivery information. A keyword that represents the contents of the information body of the delivery information is located at the position of the keyword. Information useful for recognition as to what type of user the information of the delivery information is directed to is located at the position of the favorites information. For example, as in the case of the personal favorites information of the personal information, an age, a gender, hobbies, fields (genres) of interest of a user, etc. are located at the position of the favorites information. A summary of the information body of the delivery information is located at the position of the summary information. In this embodiment, for example, an HTML file (a file written in HTML) that constitutes a home page is located at the position of the information body.

As described above, the ID server 6 also serves as an IP server and hence manages home pages by itself too. HTML files of home pages that are managed by the ID server 6 itself are stored in the delivery information storing section 13 as information bodies of delivery information. On the other hand, as for a home page that is managed by, for instance, the IP server 5, identifying information for identifying its HTML file is located at the position of the information body. Specifically, a URL of a home page that is managed by the ID server 5, for instance, is located at the position of the information body.

Where the URL is used as the information identifier as described above, it is necessary to use, so to speak, dummy URLs for home pages that are managed by servers other than the ID server 6. If URLs of home pages that are managed by servers other than the ID server 6 were used as information identifiers as they are and if a user were to access those home pages by using the information identifiers, those home pages would be accessed not through the ID server 6 (an access through the ID server 6 possibly occurs by accident). In this case, the history information of the user cannot be managed by the ID server 6.

Therefore, where the URL is used as the information identifier, it is necessary to use dummy URLs with which the ID server 6 is necessarily accessed (hereinafter simply referred to as "dummy URLs" where appropriate; specifically URLs including a host name and a domain name that are assigned to the ID server 6) for home pages that are managed by servers other than the ID server 6. In this case, when accessed with a dummy URL, the ID server 6 can refer to the information body of the delivery information having the dummy URL as an information identifier and then request another server, by using, say, a true URL, to transmit the home page concerned.

More specifically, assume that the domain names of the EP server 5 and the ID server 6 are, for instance, www.xxx.yyy and www.aaa.bbb, respectively, and that the IP server 6 manages a home page whose URL is "http://www.xxx.yyy/contents-l.html." In this case, in the ID server 6, a URL (dummy URL) "http://www.aaa.bbb/contentsl.html" that is produced by replacing the domain name www.xxx.yyy with www.aaa.bbb is used as an information identifier and the true URL "http://www.xxx.yyy/contentsl.html" is located at the position of an information body. When the home page is requested by using the dummy URL "http://www.aaa.bbb/contents-l.html," the request is received by the ID server 6 that is assigned the domain name www.aaa.bbb. Upon reception of the request, the ID server 6 can refer to the delivery information and request, by using the true URL "http://www.xxx.yyy/contents-l.html" that is located at the position of the information body, the IP server 5 to transmit the home page whose file name is "/contents-l.html." Further, after receiving the home page from the IP server 5, the ID server 6 can transfer the home page to the user who requested it.

Next, the process of the ID server 6 will be described by dividing it into a personal information registration process for registering personal information, a delivery information registration process for registering delivery information, an individual delivery information construction process for constructing individual delivery information, information transmission process for transmitting a home page as information requested by a user, and a personal favorites information update process for updating personal favorites information.

First, to allow a user to be given the new home page informing service, his personal information needs to be registered in the personal information storing section 11. For example, personal information can be registered such that a user writes necessary items on a prescribed form and mail it to the manager of the ID server 6 to have him manipulate the personal information registration section 12. Alternatively, personal information can be registered online.

In the delivery information storing section 13, a registration picture for allowing input of items necessary for registration of personal information is stored so as to be provided in the form of a home page. A user who wants to have his personal information registered online requests the registration picture by manipulating the user terminal 1. Specifically, the user causes the user terminal 1 to transmit a URL that corresponds to the home page as the registration picture to the ID server 6 via the public network 2, the SP server 3, and the Internet 4.

Figure 5:
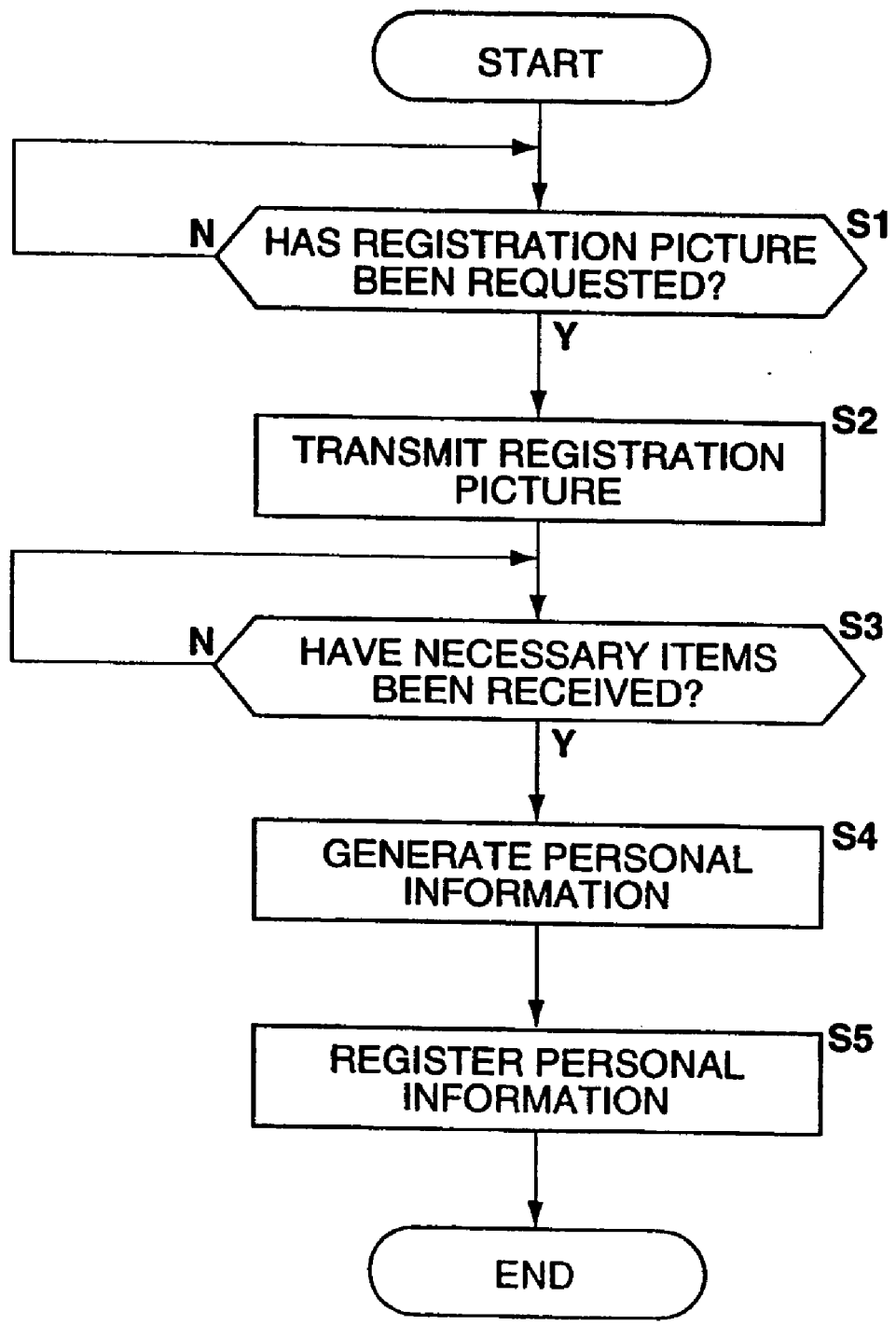
FIG. 5 is a flowchart showing a personal information registration process.

In response, the following process is executed in the ID server 6. At step S1 of a personal information registration process shown in FIG. 5, it is judged whether the registration picture has been requested, that is, whether the URL of the registration picture has been received by the communication control section 20. If it is judged at step S1 that the registration picture has not been requested yet, the process returns to step S1. If it is judged at step S1 that the registration picture has been requested, that is, if the URL of the registration picture has been received, the process goes to step S2. At step S2, the readout section 19 reads out the registration picture from the delivery information storing section 13, i.e., the registration picture as an HTML file that is located at the position of the information body of the delivery information having, as an information identifier, the URL received by the communication control section 20, and controls the communication control section 20 to have it transmit the registration picture to the user terminal 1. The registration picture is thus transmitted to the user terminal 1 via the Internet 4, the SP server 3, and the public network 2 and displayed thereon.

FIG. 6 shows a display example of the registration picture.

In FIG. 6, the registration picture is constructed such that boxes for input of a name, an E-mail address, a gender, a date of birth, hobbies of a user are sequentially arranged from the top.

The user inputs his name, E-mail address, and date of birth at the respective boxes. Further, the user checks a gender box in accordance with his gender (in FIG. 6, mark "-" is given to the radio button "male" that has been checked (clicked) by the user by manipulating the user terminal 1) and also checks hobbies boxes of genres of interest (i.e., genres that correspond to his favorites (in FIG. 6, mark "x" is given to the check boxes "music" and "games" that have been checked by the user by manipulating the user terminal 1).

After inputting the necessary items on the registration picture, the user manipulates the user terminal 1 to have the necessary items to be transmitted. As a result, the necessary items are transmitted to the ID server 6 (via the public network 2, the SP server 3, and the Internet 4).

In response, the following process is executed in the ID server 6. After transmitting the registration picture at step S2 in FIG. 5, the process goes to step S3, where it is judged whether the necessary items sent from the user terminal 1 have been received by the communication control section 20. If it is judged at step S3 that the necessary items have not been received yet, the process returns to step S3. If it is judged at step S3 that the necessary items have been received, the process goes to step S4, where personal information is generated based on the necessary items.

That is, upon reception of the necessary items from the user terminal 1, the communication control section 20 supplies those to the personal information registration section 12. Upon reception of the necessary items from the communication control section 20, the personal information registration section 12 constructs personal information (see FIG. 3) by locating the E-mail address that is included in the necessary items at the position of the person identifier and locating, at the position of the personal favorites information, the items that have been input to the boxes of the name, gender, date of birth, and hobbies in the registration picture. At the stage of registering the personal information, no particular information is located at the position of the information browsing history.

After the personal information is generated in the above manner, the process goes from step S4 to step S5, where the personal information registration section 12 registers the personal information in the personal information storing section 11. The personal information registration process is then finished.

When a new home page is transmitted from an information provider or a new home page is registered in the IP server 5, the ID server 6 executes a delivery information registration process for registering delivery information of the new home page.

Figure 7:
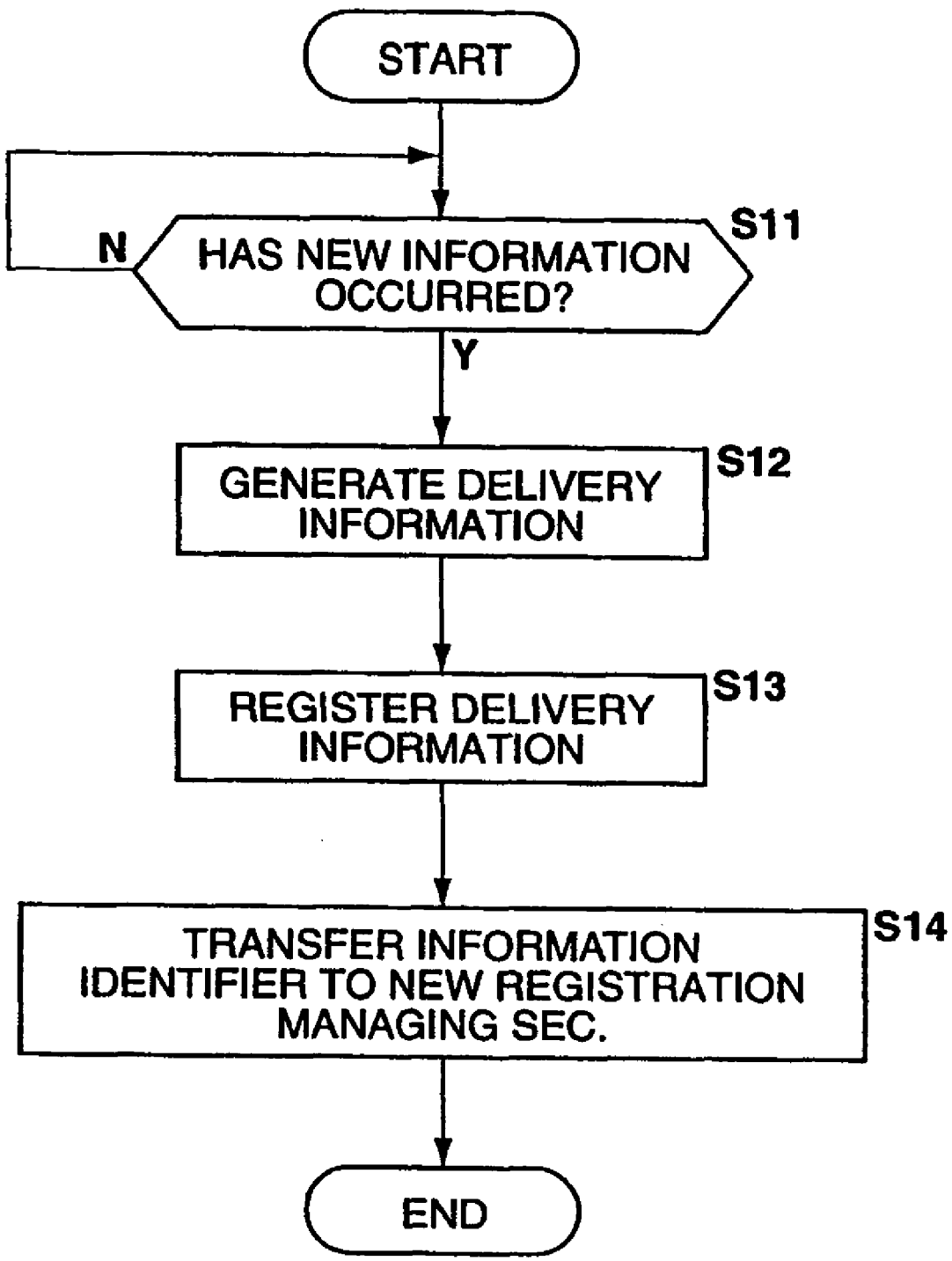
FIG. 7 is a flowchart showing a delivery information registration process.

In the delivery information registration process, first, at step S11 shown in FIG. 7, it is judged whether a new home page has occurred on the Internet 4. If it is judged that no new home page has occurred, the process returns to step S11. If it is judged at step S11 that a new home page has occurred, the process, goes to step S12, where delivery information of the new home page is generated in the delivery information registering section 14.

Specifically, for instance, when a new home page has been transmitted from an information provider, it is judged at step S11 that a new home page has occurred. That is, when a user as an information provider has transmitted an HTML file via the Internet 4 to establish a home page on the ID server 6, it is judged at step S11 that a new home page has occurred.

In this embodiment, when a new home page has been established on a server other than the ID server 6, say, the IP server 5, the IP server 5 sends a message to that effect (hereinafter called "new home page establishment message" where appropriate) to the ID server 6. Also when receiving a new home page establishment message in this manner, the ID server 5 judges at step S11 that a new home page has been established.

In addition to judging whether a new home page establishment message has been received, whether a new home page has been established on the IP server 5 can be judged by having the delivery information registration section 14 search the home pages that are managed by the IP server 5.

However, if whether a new home page has been established were judged on all IP servers (WWW servers) connected to the Internet 4 (or constituting the Internet 4), enormous time is needed for the judgment process. Therefore, it is desirable that the number of IP servers as subjects of the judgment process be limited to a certain number.

When a new home page has occurred on the Internet 4, as described above the process goes from step S11 to step S12, where delivery information of the home page is generated in the delivery information registering section 14 in the following manner, for instance.

When a new home page that should be managed by the ID server 6 is transmitted from a user as an information provider, the home page is received by the communication control section 20 and supplied to the delivery information registering section 14. Upon reception of the new home page, the delivery information registering section 14 locates, as an information identifier, the URL of the home page at the head of delivery information (see FIG. 4). Further, the delivery information registering section 14 extracts a preset word (keyword) from the new home page and employs it as a keyword of the delivery information. The delivery information registering section 14 judges, based on, for instance, the keyword, the genre of the new home page and employs a judgment result as favorites information of the delivery information. Alternatively, favorites information may be transmitted from an information provider together with a new home page. In this case, the transmitted information itself is employed as favorites information of delivery information.

Further, the delivery information registering section 14 extracts, for instance, a title etc. from the new home page and employs it as summary information of the delivery information. Still further, the delivery information registering section 14 employs the new home page itself, i.e., the HTML file, as an information body of the delivery information.

On the other hand, when receiving a new home page establishment message from the IP server 5, the ID server 6 the IP server 5 to transmit the new home page and generates delivery information of the new home page basically in the same manner as in the above-described case. However, in this case, a dummy URL is located at the position of the information identifier of the delivery information and a true URL is located at the position of the information body of the delivery information. Although it is possible to locate data (HTML file) of the home page that has been newly established in the IP server 5 at the position of the delivery information, this causes the delivery information to have a large data amount. Therefore, as to a home page newly established in the IP server 5, it is desirable to employ, for instance, a true URL of the home page as an information body of delivery information, as described above.

When the delivery information of the new home page has been generated in the delivery information registering section 14, the process goes from step S12 to step S13, where the delivery information is registered in the delivery information storing section 13. Thereafter, the process goes to step S14, where the delivery information registering section 14 transfers the information identifier of the delivery information that has been newly registered in the delivery information storing section 13 to the new registration managing section 15. The delivery information registration process is then finished.

The new registration managing section 15 receives and stores the identifier of the new delivery information that is supplied from the delivery information registering section 14.

In the above manner, information identifiers of new pieces of delivery information are stored in the new registration managing section 15. Based on the information identifiers stored in the new registration managing section 15, the individual delivery information constructing section 16 executes an individual delivery information construction process for informing occurrence of a home page that suits the favorites of a user on a regular basis, for instance (once a day, for instance).

Figure 8:
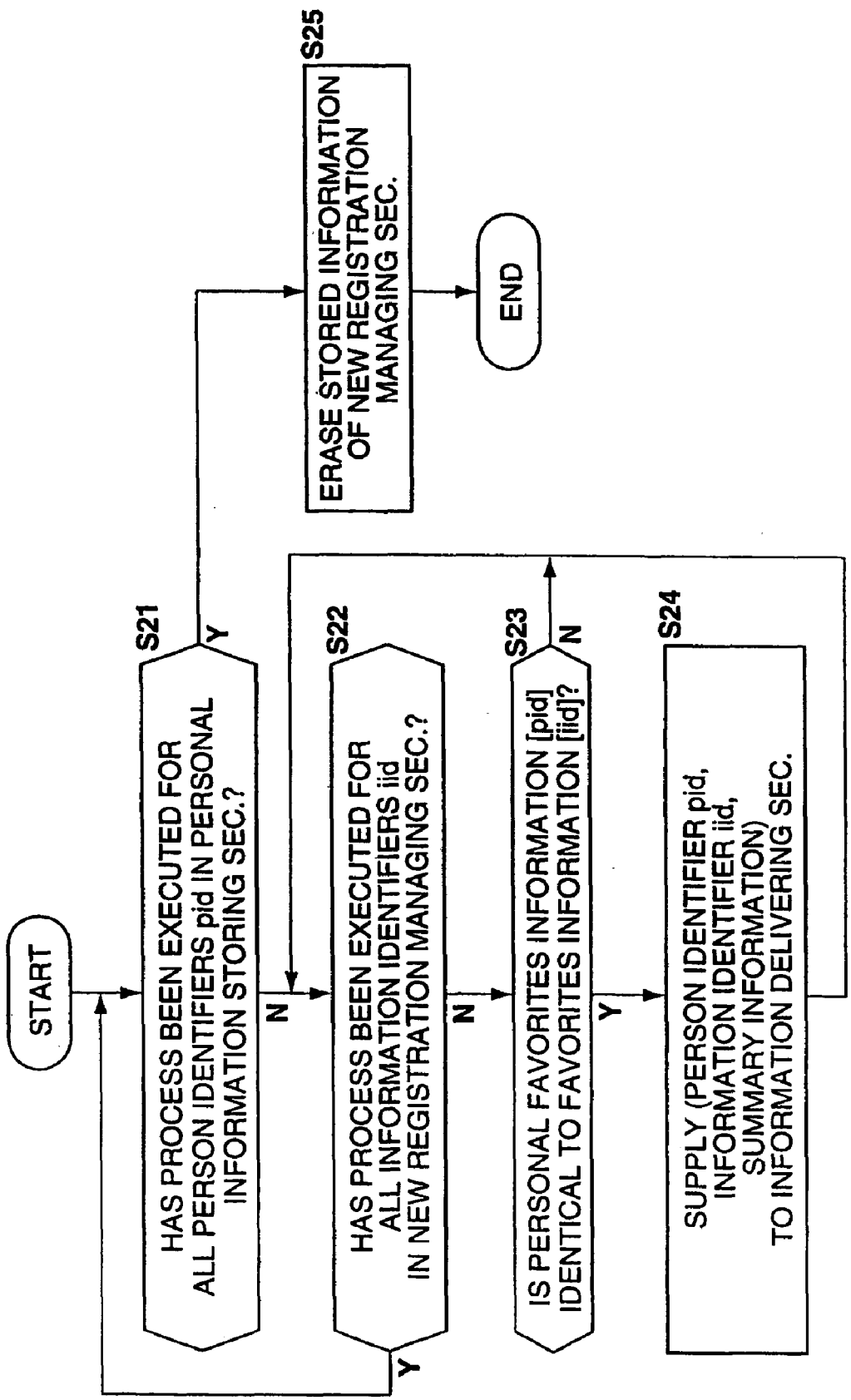
FIG. 8 is a flowchart showing an individual delivery information construction process.

In the individual delivery information construction process shown in FIG. 8, first, at step S21, it is judged whether the process has been executed for all person identifiers of the personal information stored in the personal information storing section 11. If it is judged at step S21 that not all person identifiers of the personal information stored in the personal information storing section 11 have been subjected to the process, a person identifier that has not been subjected to the process yet is made a subject of the process (subject person identifier pid) and the process goes to step S22.

At step S22, it is judged whether all information identifiers stored in the new registration managing section 15 have been subjected to the process. If it is judged at step S22 that not all information identifiers stored in the new registration managing section 15 have been subjected to the process, an information that has not been subjected to the process is made a subject of the process (subject information identifier iid) and the process goes to step S23.

At step S23, the personal information having the subject person identifier pid as its person identifier is retrieved from the personal information storing section 11 and its personal favorites information (hereinafter expressed as "personal favorites information [pid]" in which pid is used as an argument, where appropriate) is read out. Further, at step S23, the delivery information having the subject information identifier iid as its information identifier is retrieved from the delivery information storing section 13 and its favorites information (hereinafter expressed as "favorites information [iid]" in which iid is used as an argument, where appropriate) is read out. Still further, at step S23, it is judged whether the personal favorites information [pid] coincides with the favorites information [iid] (whether the user's favorites represented by the personal favorites information [pid] coincides with the favorites represented by the favorites information [iid]).

If it is judged at step S23 that the personal favorites information [pid] coincides with the favorites information [iid], that is, if the information (home page) that is located at the position of the information body of the delivery information corresponding to the subject information identifier iid suits the favorites of the user corresponding to the subject person identifier pid, the process goes to step S24. At step S24, the summary information of the delivery information corresponding to the subject information identifier iid is read out from the delivery information storing section 13. Then, the subject person identifier pid, the subject information identifier iid, and the read-out summary information are combined into individual delivery information, which is supplied to the information delivering section 17. Then, the process returns from step S24 to step S22.

If it is judged at step S23 that the personal favorites information [pid] does not coincide with the favorites information [iid], that is, if the information that is located at the position of the information body of the delivery information corresponding to the subject information identifier iid does not suit the favorites of the user corresponding to the subject person identifier pid, the process returns to step S22 skipping step 24.

If it is judged at step S22 that all information identifiers stored in the new registration managing section 15 have been subjected to the process, the process returns to step S21.

On the other hand, if it is judged at step S21 that all person identifiers of the personal information stored in the personal information storing section 11 have been subjected to the process, the process goes to step S25, where the information identifiers of the new pieces of delivery information stored in the new registration managing section 15 are deleted (erased). The individual delivery information construction process is then finished.

When pieces of individual delivery information including summary information of home pages that suit the favorites of respective users are constructed in the individual delivery information construction section 16 in the above manner, the information delivering section 17 transmits the pieces of individual delivery information to the respective users in the form of E-mail, for instance, thereby informing the users of the new establishment of the home pages that suit the favorites of the respective users.

That is, upon reception of individual delivery information from the individual delivery information constructing section 16, the information delivering section 17 correlates (link) the summary information and the information identifier (in this embodiment, as described above, the URL) of the individual delivery information with each other and constructs E-mail by employing the summary information and the information identifier as its body. Further, the information delivering section 17 transfers the E-mail to the communication control section 20 with its address set to the person identifier (in this embodiment as described above, the E-mail address that constitutes the individual delivery information), thereby having the E-mail transmitted. As a result, the E-mail (hereinafter referred to as "informing E-mail" where appropriate), having as a body the summary of the home page that suits the favorites of the user, for informing the new establishment of the home page is transmitted to the user terminal 1 of the user (more correctly, in this embodiment, to the SP server 3 having what is called a mail box of the user of the user terminal 1).

Basically, pieces of individual delivery information having the same information identifier are combined into single informing E-mail. This is because if informing E-mail were formed for each individual delivery information, many pieces of informing E-mail having the same purpose of informing a user of the new establishment of a home page would be transmitted to the user.

Looking at the summary information that is described in the body of the informing E-mail that comes in the above manner, the user of the user terminal 1 requests the home page corresponding to the summary information by manipulating the user terminal 1 if he wants it. Specifically, for example, he inputs the URL that is the information identifier described in the informing E-mail together with the summary information and transmits it from the user terminal 1 to the SP server 3 via the public network 2.

In this embodiment, as described above, the information identifier is correlated with the summary information that is described in the informing E-mail. Therefore, the home page can also be requested by clicking on a display portion of the desired summary information or information identifier by using a pointing device such as a mouse. In this case, if the display portion of the summary information is clicked on, the URL as the information identifier that is correlated with the summary information is transmitted from the user terminal 1 to the SP server 3 via the public network 2. Similarly, if the display portion of the information identifier is clicked on, the URL as the information identifier is transmitted.

The SP server 3 receives the URL that is transmitted from the user terminal 1 and then transmits it to the ID server 6. Since the information identifier is the URL including the domain name of the ID server 6 as described above, it reaches the ID server 6 except for special cases such as occurrence of an error during a transmission.

Figure 9:
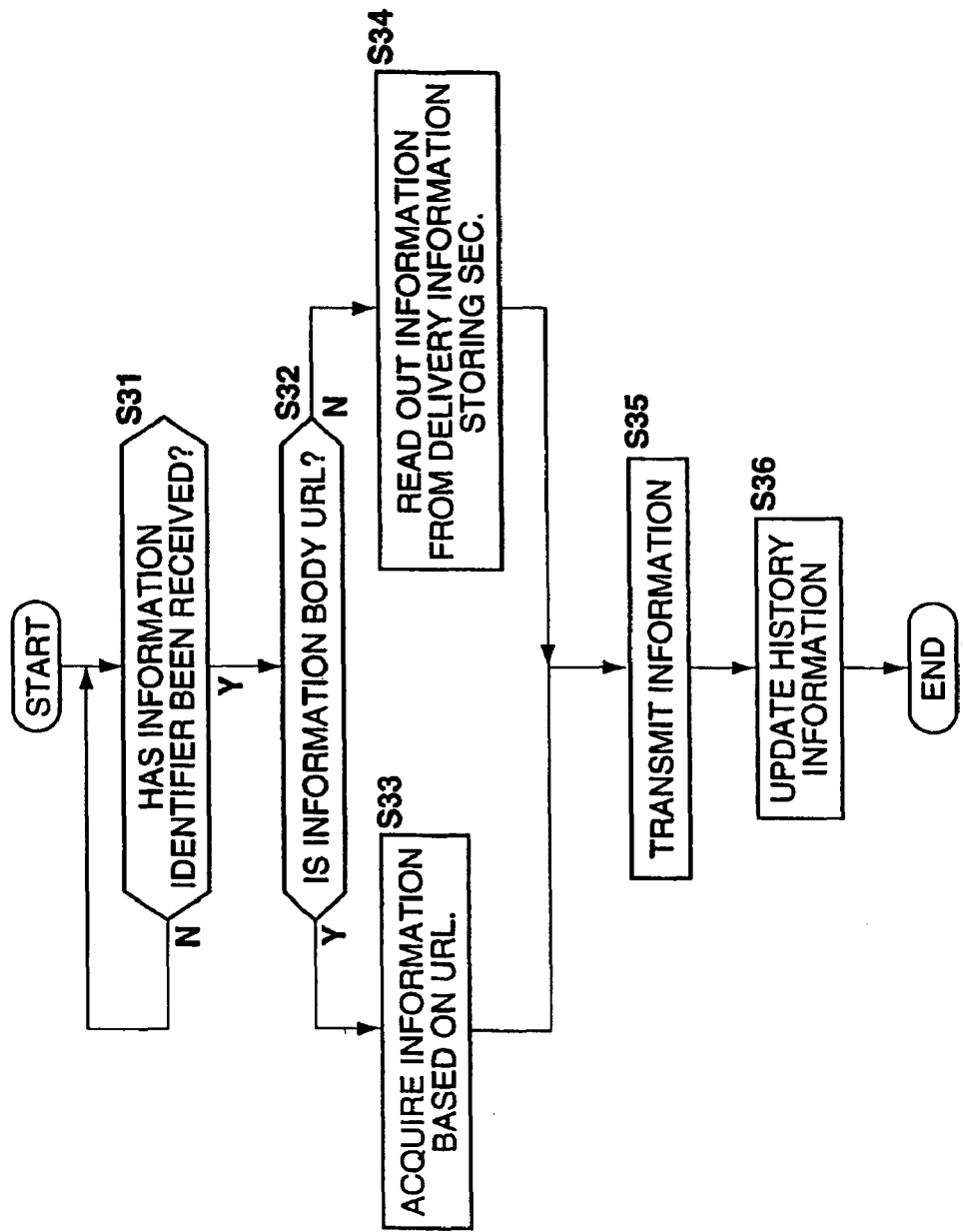
FIG. 9 is a flowchart showing an information transmission process.

In response, the ID server 6 executes an information transmission process shown in FIG. 9.

In the information transmission process, first, at step S31, it is judged whether an information identifier sent from a user has been received by the communication control section 20. If it is judged that it has not been received yet, the process returns to step S31. If it is judged at step S31 that the information identifier has been received, the information identifier is transferred from the communication control section 20 to the readout section 19. Upon reception of the information identifier from the communication control section, the readout section 19 retrieves the delivery information where the information identifier is located from the delivery information storing section 13 and refers to the information body of the retrieved delivery information. Then, at step S32, the readout section 19 judges whether the referenced information body is a URL.

If it is judged at step S32 that the information body is a URL, that is, if the home page that is requested by the user is not one stored in and managed by the ID server 6 but one stored in and managed by a server other than the ID server 6, such as the IP server 5, the process goes to step S33. At step S33, the readout section 19 controls the communication control section 20 so that the communication control section 20 transmits the URL that is located at the position of the information body to the IP server 5 via the Internet 4. The home page corresponding to the URL is thereby acquired from the IP server 5, and the process goes to step S35.

On the other hand, if it is judged at step S32 that the information body is not a URL, that is, if the home page that is requested by the user is one stored in and managed by the ID server 6, i.e., stored in the delivery information storing section 13, the process goes to step S34. At step S34, the readout section 19 reads out, from the delivery information storing section 13, data (HTML file) of the home page as the information body that was referenced at step S34. The process then goes to step S35.

At step S35, the readout section 19 transmits, to the user terminal 1, the home page that has been acquired from the IP server 5 or read out from the delivery information storing section 13.

The home page that is transmitted from the ID server 6 is received by and displayed on the user terminal 1. Thus, the user can easily acquire new information that suit his favorites.

Upon the transmission of the home page requested by the user, the process goes from step S35 to step S36, where the ID server 6 updates the history information.

The delivery information reading section 18 monitors home pages that the readout section 19 transmits to users. When a home page is transmitted at step S35, at step S36 the delivery information reading section 18 writes its history information to the personal information storing section 11.

Specifically, the history information is written in the following manner. For example, a request for a home page from a user is made such that the person identifier that is the E-mail address of the user is transmitted from the user terminal 1 to the ID server 6 together with the information identifier that is the URL (or the dummy URL in the embodiment) of the home page. Therefore, the readout section 19 receives the information identifier of the home page and the person identifier of the user who requests the home page.

At step S36, the delivery information reading section 18 reads out, from the personal information storing section 11, the personal information (see FIG. 3) corresponding to the person identifier received by the readout section 19 and adds the information identifier received by the readout section 19 to the information browsing history of the read-out personal information. Further, at step S36, the delivery information reading section 18 writes the history-information-added person information to the personal information storing section 11. The information transmission process is then finished.

In the above manner, home pages are transmitted (delivered) to users and history information of the transmitted homes pages is recorded.

Next, the above-described individual delivery information construction process (FIG. 8) and the information transmission process (FIG. 9) will be described in more detail with reference to FIG. 2 and FIG. 10 that is similar to FIG. 2.

Figure 10:
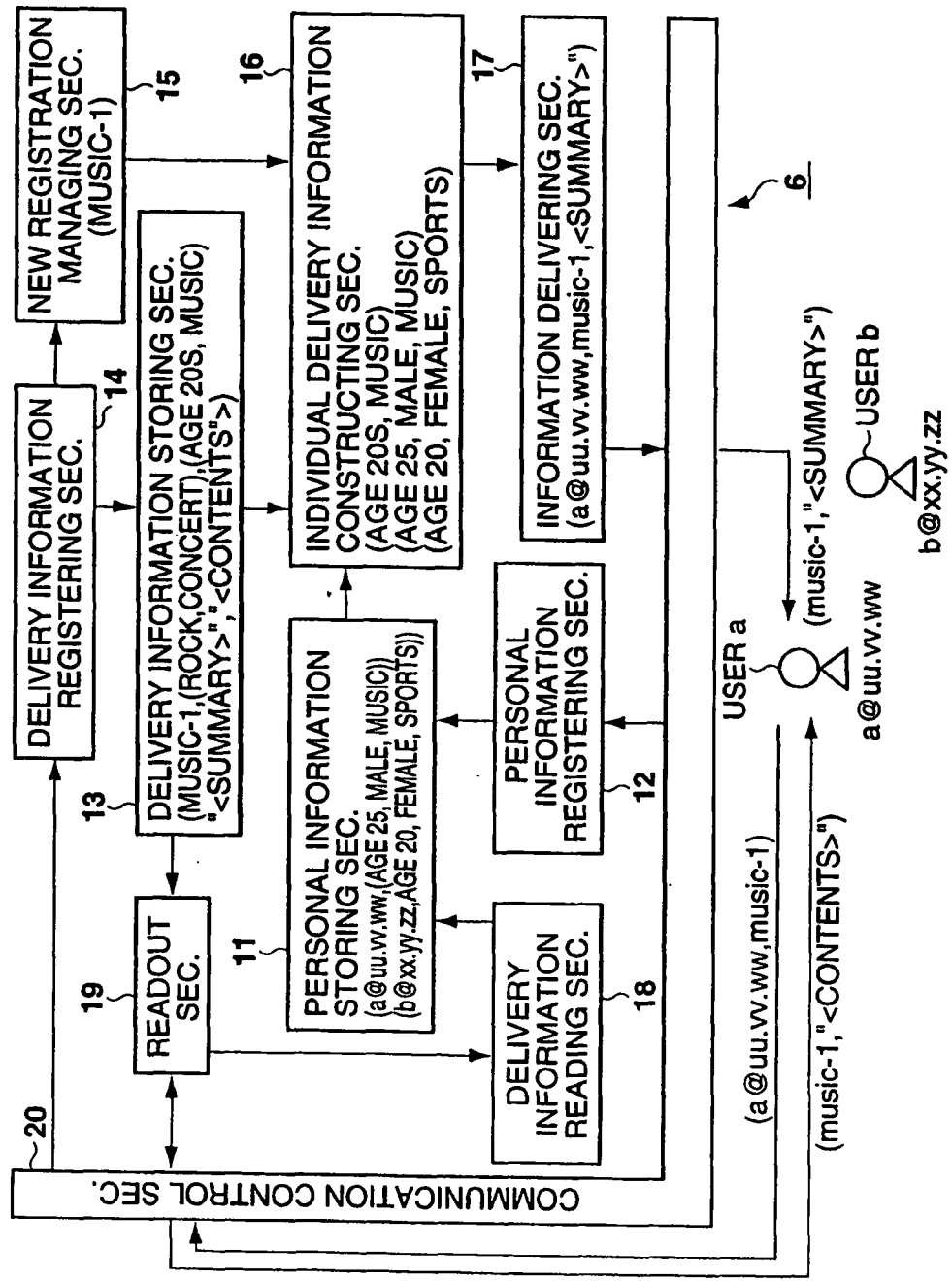
FIG. 10 shows processes executed by the ID server 6 shown in FIG. 2.

In the example of FIG. 10, pieces of personal information of users a and b having E-mail addresses a@uu.vv.ww and b@xx.yy.zz, respectively, are stored in the personal information storing section 11. In the example of FIG. 10, pieces of information "the age is 25," "the gender is male," and "the genre of interest is music" are registered as personal favorites information of the personal information of user a, and pieces of information "the age is 20," "the gender is female," and "the genre of interest is sports" are registered as personal favorites information of the personal information of user b. Further, in the example of FIG. 10, no information browsing histories have been registered yet.

Now assume that delivery information in which "music-1" is described as information identifier, "rock" and "concert" are described as keywords, and "the age is 20s" and "the genre is music" are described as favorites information has been newly registered in the delivery information storing section 13 by the delivery information registering section 14. To avoid unduly complicating FIG. 10, in FIG. 10 the summary information and the information body are expressed as <Summary> and <Contents>, respectively. Further, to simplify the description, "music-1," which is not in the URL format, is used as the information identifier.

In this case, the information identifier "music-1" is transferred from the delivery information registering section 14 to the new registration managing section 15 and stored therein.

When the individual delivery information construction process is started in the individual delivery information constructing section 16, the information identifier "music-1" that is stored in the new registration managing section 15 is read out and the favorites information "the age is 20s" and "the genre is music" of the delivery information having the information identifier "music-1" is also read out from the delivery information storing section 13.

Then, the above favorites information is compared with the personal favorites information of the personal information stored in the personal information storing section 11. In the example of FIG. 10, as described above, the pieces of personal favorites information of users a and b are registered, which are therefore compared with the favorites information "the age is 20s" and "the genre is music."

In this case, the favorites information "the age is 20s" and "the genre is music" coincides with the personal favorites information of user a "the age is 25" and "the genre of interest is music." On the other hand, although the favorites information "the age is 20s" coincides with the personal favorites information of user b "the age is 20s," the favorites information "the genre is music" does not coincide with the personal favorites information of user b "the genre of interest is sports."

Therefore, in this case, individual delivery information will be constructed only for user a who has the personal favorites information that coincides with both pieces of favorites information "the age is 20s" and "the genre is music." That is, the person identifier a@uu.vv.ww of the personal information of user a is read out from the personal information storing section 11 and the summary information <Summary> of the delivery information corresponding to the information identifier "music-1" is read out from the delivery information storing section 13. They are transferred from the individual delivery information constructing section 16 to the information delivering section 17 together with the information identifier "music-1." The information delivering section 17 generates informing E-mail having the summary information <Summary> and the information identifier "music-1" as a body and transmits it to the user a who has the person identifier a@uu.vv.ww as an E-mail address.

If user a requests the home page after reading the informing E-mail, he transmits, to the ID server 6, the information identifier "music-1" that is described in the informing E-mail and the person identifier a@uu.vv.ww that is his own E-mail address. The information identifier "music-1" and the person identifier a@uu.vv.ww are received by the communication control section 20 and transferred to the readout section 19. The readout section 19 retrieves, from the delivery information storing section 13, the delivery information having the information identifier that has been transferred from the communication control section 20 and reads out its information body <Contents>. The information contents <Contents> is transmitted to user a who has the person identifier a@uu.vv.ww as an E-mail address.

On the other hand, the delivery information reading section 18 adds, as history information, the information identifier "music-1" to the information browsing history of the personal information having the person identifier a@uu.vv.ww that is stored in the personal information storing section 11.

The ID server 6 is so configured as to execute, for instance, at predetermined timing, a personal favorites information update process for updating personal favorites information of personal information having a predetermined number or more of information identifiers as history information.

Figure 11:
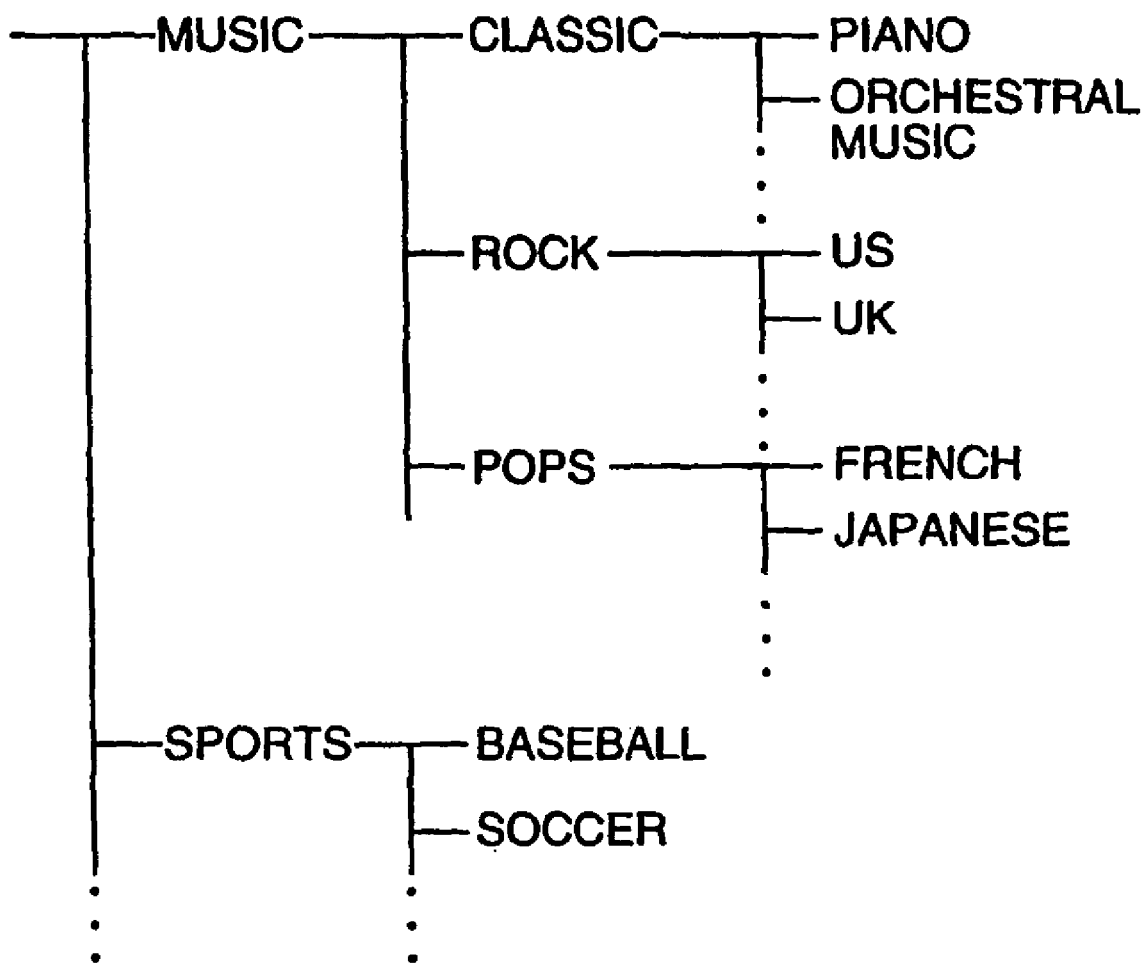
FIG. 11 illustrates genre management in the ID server 6.

In the ID server 6, genres of home pages are managed so as to be classified hierarchically, for instance, as shown in FIG. 11. At the highest level, the genres are classified into large items of "music," "sports," etc. For example, the item "music" is classified into medium items of "classic," "rock," "pops," etc. at the second level. Further, the item "classic," for example, is classified into small items of "piano" (played with the piano), "orchestral music," etc. at the third level.

It is possible to construct the registration picture (see FIG. 6) that is transmitted to a user in the personal information registration process (see FIG. 5) so that it allow the user to input small items of genres, for instance. However, since the number of small items is large, it would be cumbersome for the user to select desired ones from those items. Therefore, in this embodiment, only the large items of genres, which are small in number, are displayed in the registration picture the user selects ones that suit his favorites from those items. The selected items are registered as personal favorites information. Thereafter, in the personal favorites information update process, the personal favorites information is dynamically updated (addition and alteration of genres) based on history information. The personal favorites information thus comes to correctly represent the favorites of the user.

Figure 12:
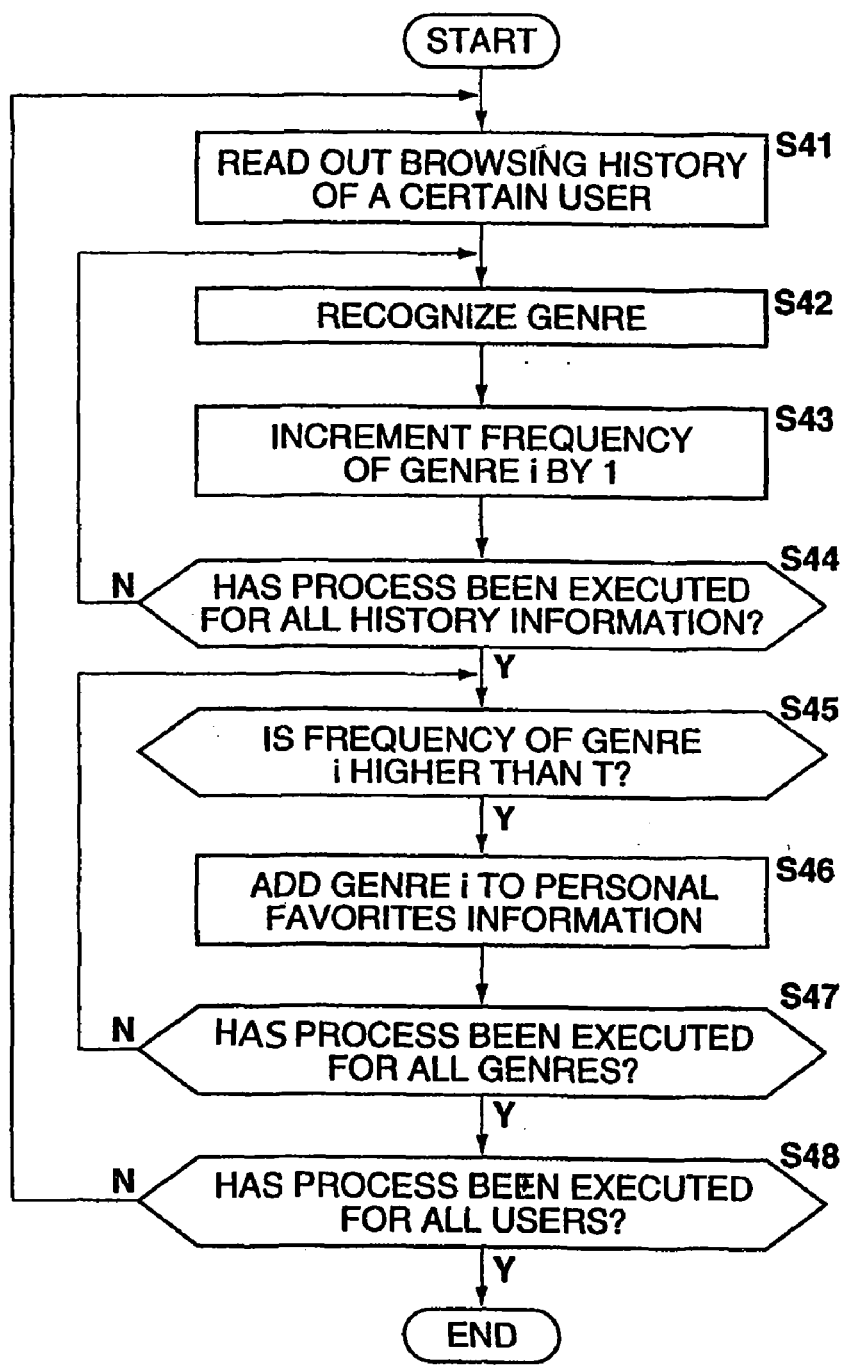
FIG. 12 is a flowchart showing the personal favorites information update process.

Specifically, the personal favorites information update process is executed as shown in FIG. 12. First, at step S41, the delivery information reading section 18 retrieves, from the personal information storing section 11, certain personal information (subject personal information) having a predetermined number or more of information identifiers as history information. Further, the delivery information reading section 18 reads out the information identifiers as history information that are located at the position of the information browsing history and employs one of the read-out information identifiers as a subject information identifier. Then, at step S42, the delivery information reading section 18 retrieves the delivery information having the subject information identifier as an information identifier from the delivery information storing section 13 and recognizes the genre that is described in the favorites information as a genre of a home page that the user has already viewed.

The genre recognized at step S42 is hereinafter expressed as "genre #i."

Then, the process goes from step S42 to step S43, where the delivery information browsing section 18 increments by 1 a variable (hereinafter expressed as "frequency variable #i") for counting the frequency at which the user have viewed home pages of genre #i. The process then goes to step S42. It is noted that the frequency variable #i is cleared to, for instance, 0 at step S41.

At step S44, it is judged whether all information identifiers as history information that were read out at step S41 have been subjected to the process. If it is judged that not all information identifiers have been subjected to the process yet, the process returns to step S42 to repeat the same steps after setting an information identifier that has not been subjected to the process yet as a new subject information identifier.

If it is judged at step S44 that all information identifiers as history information that were read out at step S41 have been subjected to the process, that is, if the frequencies of the genres of home pages that have been viewed (browsed) by a certain user have been determined, the process goes to step S45. At step S45, one of the frequency variables that have been determined for the respective genres is employed as a subject frequency variable and it is judged whether the subject frequency variable is greater than (or greater than or equal to) a predetermined positive integer T.

If it is judged at step S45 that the subject frequency variable is greater than the predetermined value T, that is, if home pages of the genre corresponding to the subject frequency variable have been viewed by the user more than T times, the process goes to step S46. At step S46, the delivery information reading section 18 adds the genre corresponding to the subject frequency variable to the personal favorites information of the subject personal information. The process then goes to step S47.

If it is judged at step S45 that the subject frequency variable is smaller than or equal to (or smaller than) the predetermined value T, that is, if home pages of the genre corresponding to the subject frequency variable have scarcely (or never) been viewed by the user, the process goes to step S47 skipping step S46.

At step S47, it is judged whether all frequency variables that were determined for the respective genres have been subjected to the process. If it is judged that not all frequency variables have not been subjected to the process yet, the process returns to step S45 to repeat the same steps after setting a frequency variable that has not been subjected to the process yet as a new subject frequency variable. If it is judged at step S47 that all frequency variables have been subjected to the process, the process goes to step S48. At step S48, it is judged whether all pieces of personal information in which the number of information identifiers as history information is greater than or equal to a predetermined number have been subjected to the process, i.e., employed as subject personal information.

If it is judged at step S48 that not all pieces of personal information in which the number of information identifiers as history information is greater than or equal to a predetermined number have been subjected to the process, the process returns to step S41 to repeat the same steps after setting personal information that has not been subjected to the process yet as subject personal information.

On the other hand, if it is judged at step S48 that all pieces of personal information in which the number of information identifiers as history information is greater than or equal to a predetermined number have been subjected to the process, the delivery information reading section 18 deletes the pieces of personal information that have been subjected to the process among the pieces of personal information stored in the personal information storing section 11. The personal favorites information update process is then finished.

As described above, the frequency of a genre of home pages that have been viewed by a user is counted, and, so to speak, the favorites of the user are estimated based on the counted frequency and the personal favorites information is updated accordingly. Therefore, it becomes possible to inform respective users that home pages more suited to the favorites of the users have been newly established.

That is, according to the personal favorites update process, if after selecting (inputting) large items (general items) of, for instance, "sports" and "music" on the registration picture a user frequently views home pages of genres "baseball" and "classic" that are at a lower level than the genres "sports" and "music," respectively, those finer genres are registered in the personal favorites information. Therefore, the user can acquire information about home pages that are more suited to his favorites.

Further, according to the personal favorites information update process, even as for a genre that does not belong to any genres that a user previously input on the registration picture, if a user requests, at a certain number of times, the ID server 6 to transmit home pages of that genre, the personal favorites information comes to reflect that genre. Therefore, the user can receive information about new establishment of home pages of a genre that was not input on the registration picture.

Although in the above example fine genres are added to the personal favorites information, a modification is possible in which the general genres already included in the personal favorites information are deleted and only fine genres are caused to be newly included in the personal favorites information.

It is possible to have the personal favorites information include not only genres but also frequencies at which a user has viewed home pages of the respective genres, i.e., values of the frequency variables that are determined in the personal favorites information update process of FIG. 12. Specifically, in a case where the frequency variable of a genre "baseball" has a value 10, it is possible to have the personal favorites information to include a combination of the genre "baseball" and its frequency "10." In this case, the degrees of interest of a user in respective genres are expressed in, so to speak, multi-value form by using the frequencies. Therefore, by using this, it is possible to provide informing E-mail that can be used more easily by the user. Specifically, for example, for a genre of a higher frequency the period of delivering informing E-mail may be shortened. Further, pieces of summary information of home pages belonging to genres of higher frequencies may be allocated, in order, to the body of informing E-mail.

It is also possible to have the personal favorites information to include a combination of a genre, its frequency, and dates when a user viewed (requested) home pages of that genre (hereinafter referred to as "time stamps"). For example, in a case where a user viewed home pages of a genre "music" 10 times and the last viewing was on Oct. 10, 1996, a combination of these pieces of information (music, 10 times, Oct. 10, 1996) is included in the personal favorites information. In this case, in the personal favorites information update process, N genres (N: positive integer) of home pages that a user viewed recently may be recognized from the time stamps. Further, N genres of higher frequencies may be recognized from the time stamps and the other genres may be deleted from the personal favorites information while only the N genres are left therein. In this manner, the personal favorites information update process makes it possible to avoid a case that too many genres are included in the personal favorites information.

It is possible to provide to a user personal favorites information that has been updated by the personal favorites information update process, for instance, every update thereof or in response to the user's request in the form of E-mail or a home page as shown in FIG. 13. In FIG. 13, mark "x" is given to the check boxes (indicated by squares in FIG. 13) of the genres that are included in updated personal favorites information.

In this case, the user can modify the genres that are provided in the form of E-mail or a home page as shown in FIG. 13. That is, by manipulating the user terminal 1, for instance, the user gives mark "x" to the check box of a genre he desires or erase mark "x" when it is given to the check box of a genre he does not desire, and has modified genres transmitted to the ID server 6. (Both giving and erasure of mark "x" can be effected by clicking on a check box.) In response, in the ID server 6 the personal favorites information is altered so as to reflect genres transmitted from the user terminal 1.

In the example of FIG. 9, when the ID server 6 has received, from the user, a browsing request of a home page that is stored in and managed by a server other than the ID server 6, say, the IP server 5, rather than stored in and managed by the ID server 6, the ID server 6 transmits a URL that is located at the position of the information body to the IP server 5 and acquires a home page corresponding to the URL from the IP server 5. Alternatively, the ID server 6 may have the IP server 5 to directly transmit the home page to the user terminal 1 that made the browsing request rather than acquires the home page. That is, the ID server 6 that has received an information identifier transmits, to the IP server 5, the information identifier to which an address for identifying the user terminal 1 on the network (for instance, an IP (Internet protocol) address) is added. This enables the IP server 5 to directly transmit the home page to the address that is added to the information identifier. Even with this constitution, the ID server 6 can acquire the above-described history information because the user terminal 1 once transmits the information identifier to the ID server 6.

As described above, since informing E-mail for a home page that has newly occurred on the Internet 4 and suits the favorites of respective users is generated and delivered to the respective users, the users can easily acquire information that suits their favorites (i.e., information they require). Further, since history information of home pages accessed by a user is stored by utilizing informing E-mail and the personal favorites information is updated based on the history information, it is possible to inform the user of new establishment of a home page that suits his favorites, whereby the user can be provided with, so to speak, efficient information.

Since the informing E-mail includes not a home page itself but its summary information, it is possible to avoid a case that the amount of information included in the informing E-mail becomes enormous.

Further, from the viewpoint of a home page information provider, since an age group of users whom the information provider wants to view the home page and genres of interest of those users are registered as favorites information, it is possible to have those users recognize the existence of the home page.

Although the foregoing description is directed to the case where the invention is applied to the network system that utilizes the Internet, the invention can also be applied to network systems that utilize networks other than the Internet. For example, the invention can be applied to what is called a computer communications system or the like in which user terminals are directly connected, via telephone lines or the like, to a server computer that provides information. In this case, the host computer of a computer communications system also serves as the SP server 3, the IP server 5, and the ID server 6.

Although in the embodiment a URL is used as an information identifier of delivery information (see FIG. 4), the information identifier is not limited to the URL. For example, a serial number or the like may also be used as an information identifier.

Although in the embodiment a user is informed of new establishment of a home page only when it is established, it is also possible to inform a user of alteration of the contents of a home page upon its occurrence.

In the embodiment, informing E-mail includes summary information of only home pages that have been newly established and suit the favorites of a user. A modification is possible in which informing E-mail further includes summary information of home pages for which the user has been informed of new establishment by previous informing E-mail and that have not been viewed (requested) by the user.

In this case, by causing the individual delivery information constructing section 16 (see FIG. 2) to refer to the favorites information and the information identifiers stored in the delivery information storing section 13 and the personal favorites information and the information browsing history stored in the personal information storing section 11, home pages that have not been viewed by a user and suit his favorites may be detected and individual delivery information may be constructed for such home pages.

Although in the embodiment a user is informed of new establishment of a home page that suits his favorites by E-mail, the new establishment may be announced by generating, for instance, a home page dedicated for that purpose.

Although in the embodiment new establishment of a home page is announced, it is also possible to announce a fact that information other than a home page has newly occurred.

Further, although to simplify the description the embodiment is directed to the case where whether a home page suits the favorites of a user is judged based on its favorites information, the judgment may also be done by using some other information such as a keyword of the delivery information.

According to the invention, whether information that has newly occurred on a network is suitable for the favorites of the user is judged based on user favorites information, and the user is informed of occurrence of the information that has been judged suitable for the favorites of the user. The information is delivered to the user when the information is requested by the user, and history information that relates to a history of the information that has been delivered to the user is stored. Therefore, for example, by updating the user favorites information based on the history information, the user can be informed of occurrence of information that is more suitable for his favorites.

The invention claimed is:

1. A data processing system including at least one processor and memory which includes instructions to perform a method of updating personal favorite information in a data storage unit, the method comprising the steps of:
   gathering history information or personal information of a user and registering the information in the data storage unit;
   creating a plurality of user subject categories in the data storage unit based on the registered information;
   recognizing a user subject sub category, which is related to but narrower than the user subject category, by analyzing keywords in the registered information
   counting a frequency of user requests for said user subject sub category;
   determining if said frequency is greater than a predetermined value;
   adding said user subject sub category, history information and personal information to the data storage unit upon the determination that said frequency is greater than said predetermined value;
   relating the user subject sub category to one or more of the user subject categories in the data processing unit;
   deleting the user subject categories when at least one sub category related to the user subject categories is stored in the data storage unit;
   searching a network for new data;
   identifying a keyword in the new data which is used to classify the new data into at least one of the user subject categories or to at least one user subject sub categories stored in the data storage unit;
   and
   sending a single e-mail message containing the locations of the new data found on the network to a user apparatus.

2. The data processing system of claim 1, wherein said user subject category is a genre.

3. The data processing system of claim 1, wherein said user subject categories stored in said personal favorite information unit are structured in a hierarchical manner.

4. A data processing system including a server with at least one processor and memory which includes instructions to perform a method of registering personal favorite information in the memory of the server, the method comprising the steps of:

displaying a registration picture on a user apparatus;

displaying inputted user personal information on said registration picture which includes a plurality of user subject categories;

sending said inputted user personal information to the server;

extracting at least one user subject category from the inputted user personal information in to the memory and registering the user subject category in a personal favorite information unit running in the memory of the server;

recognizing a user subject sub category, which is related to but narrower than the user subject category, by analyzing keywords in the requests made by the user;

counting the requests by the user for the user subject sub category;

adding said user subject sub category to the personal favorite information unit when the count surpasses a predetermined value;

relating the user subject sub category to one or more of the user subject categories;

deleting the user subject categories when at least one sub category related to the user subject categories is stored in the personal favorite information unit;

searching for new data on a network;

identifying a keyword in the new data which is used to classify the new data into at least one user subject category or user subject sub category stored in the personal favorite information unit;

generating delivery information including a network address of said new data; and sending a single e-mail message containing the locations of all new data found on the network to said user apparatus.

5. The data processing system of claim 4, wherein said personal favorite information unit includes at least one user subject category and said user subject category is a genre of the new data.

6. The data processing system of claim 4, wherein said personal favorite information unit includes at least one user subject category and said user subject category is structured in a hierarchical manner.

* * * * *

UNITED STATES PATENT AND TRADEMARK OFFICE
CERTIFICATE OF CORRECTION

PATENT NO. : 7,877,513 B2
APPLICATION NO. : 11/236193
DATED : January 25, 2011
INVENTOR(S) : Fumihiko Nishio et al.

It is certified that error appears in the above-identified patent and that said Letters Patent is hereby corrected as shown below:

On Title Page of the patent:

Please add:

(30) Foreign Application Priority Data

--Dec. 18, 1996 (JP)    P08-338033--

Signed and Sealed this
Tenth Day of May, 2011

David J. Kappos
*Director of the United States Patent and Trademark Office*